United States Patent
Rubinstein

(10) Patent No.: US 7,119,683 B2
(45) Date of Patent: *Oct. 10, 2006

(54) GEMSTONE INVENTORY AND DETECTION SYSTEM

(76) Inventor: Walter Rubinstein, 25801 Southwood Dr., Southfield, MI (US) 48075

( * ) Notice: Subject to any disclaimer, the term of this patent is extended or adjusted under 35 U.S.C. 154(b) by 0 days.

This patent is subject to a terminal disclaimer.

(21) Appl. No.: 11/047,072

(22) Filed: Jan. 31, 2005

(65) Prior Publication Data

US 2005/0127178 A1    Jun. 16, 2005

Related U.S. Application Data

(63) Continuation of application No. 10/437,781, filed on May 14, 2003, now Pat. No. 6,850,160.

(60) Provisional application No. 60/380,623, filed on May 15, 2002.

(51) Int. Cl.
*G08B 13/14* (2006.01)

(52) U.S. Cl. ............... 340/568.1; 340/570; 340/572.1; 340/5.92

(58) Field of Classification Search ............... 340/552, 340/568.1, 570, 572.1, 5.92, 539.1, 572.8; 235/385; 156/60; 283/75, 109
See application file for complete search history.

(56) References Cited

U.S. PATENT DOCUMENTS

| | | | | |
|---|---|---|---|---|
| 5,519,381 | A | * | 5/1996 | Marsh et al. ............... 340/10.2 |
| 5,521,601 | A | * | 5/1996 | Kandlur et al. ............... 342/44 |
| 5,793,882 | A | * | 8/1998 | Piatek et al. ................. 382/115 |
| 5,909,176 | A | * | 6/1999 | Schrott et al. ........... 340/572.1 |
| 5,955,951 | A | * | 9/1999 | Wischerop et al. ...... 340/572.8 |
| 6,127,928 | A | * | 10/2000 | Issacman et al. ......... 340/572.1 |
| 6,249,227 | B1 | | 6/2001 | Brady et al. ............. 340/572.1 |
| 6,259,369 | B1 | | 7/2001 | Monico .................... 340/572.8 |
| 6,348,864 | B1 | | 2/2002 | Lin et al. ..................... 340/570 |
| 6,741,178 | B1 | | 5/2004 | Tuttle ....................... 340/572.1 |
| 6,791,452 | B1 | * | 9/2004 | Fletcher et al. ............ 340/10.6 |
| 6,850,160 | B1 | * | 2/2005 | Rubinstein ............... 340/568.1 |

\* cited by examiner

*Primary Examiner*—Anh V. La
(74) *Attorney, Agent, or Firm*—Gifford, Krass, Groh, Sprinkle, Anderson & Citkowski, P.C.

(57) ABSTRACT

A system for controlling gemstones employs RFID chips adhered to each stone. A display or storage area includes a radiator for generating activating emission for the RFID chips and an antenna for picking up the resultant RF signals including serial number. Both the radiator and antenna are connected to a computer supporting a database with an inventory of the chips and anti-collision circuitry for identifying the chips.

11 Claims, 1 Drawing Sheet

Girdle

Adhesion Points of RFID to Stone

10

GEMSTONE INVENTORY AND DETECTION SYSTEM

RELATED APPLICATIONS

This application is a continuation of U.S. patent application Ser. No. 10/437,781 filed May 14, 2003, now U.S. Pat. No. 6,850,160 which claim priority of U.S. Provisional Patent Application Ser. No. 60/380,623 filed May 15, 2002.

BACKGROUND OF THE INVENTION

Identification of individual diamonds and other gemstones has been a longstanding problem for both jewelers and their customers. To date, the only method of identification available is the laser scribing of a serial number on the stone.

BRIEF DESCRIPTION OF THE INVENTION

The purpose of this invention is to provide a unique solution to this identification process. In this solution an RFID (radio frequency identification chip) is adhered to the girdle or some other portion of the stone, preferably a location that is not visible or is inconspicuous when the stone is mounted, by an adhesive such as a clear epoxy. Use of a UV epoxy would provide instant adhesion to the stone.

DETAILED DESCRIPTION OF THE PREFERRED EMBODIMENTS

Figure 1:
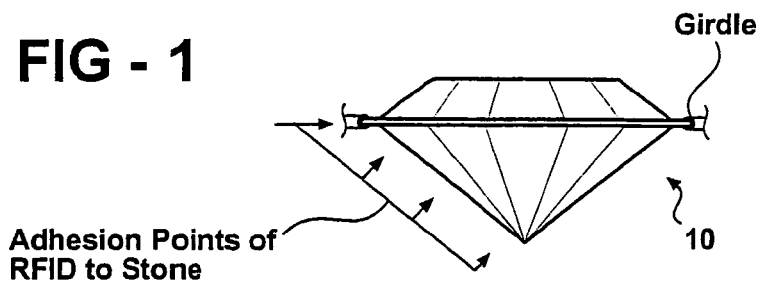
FIG. 1 is a side view of a diamond illustrating the points of attachment of RFID chips.

Referring to FIG. 1, the extremely small RFID chips are adhered to a gemstone such as a diamond 10 at a point which will not normally be visible when the gemstone is incorporated at the setting, such as along the girdle or at some point below the girdle.

To prevent exchange of an RFID equipped stone with a stone of lesser value, the chip is covered by a material which would provide a visual indication of the removal of the chip from the stone.

The RFID chip would be of the type supplied by PharmaSeq (Princeton, N.J.). This chip is activated by light and transmits its data by RF. The memory portion of the chip contains a unique serial number. In actual production, a serial number would not be duplicated for years.

Other RFID chips, such as manufactured by Hitachi (Japan) called the MU chip or others, could be utilized in this application. These chips might require activation and then transmission of their data by radio frequency signals.

This disclosure describes a system to provide inventory control and pilferage protection in such locations as jewelry stores or any location dealing with high value small objects.

In these locations, the enclosures containing these objects would be irradiated with the proper type of energy to cause the RFID to transmit its data; either light or RF energy.

Figure 2:
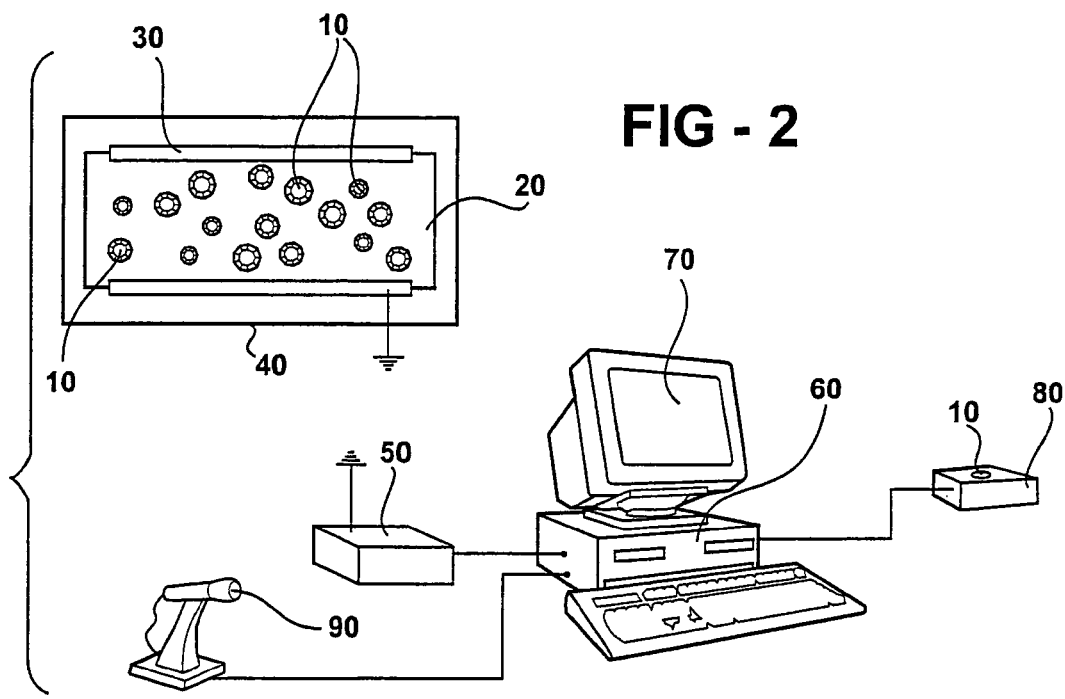
FIG. 2 is a schematic diagram of a system for inventorying and detecting the removal of gemstones from a display area.

A computer system for implementing the present invention is illustrated in FIG. 2. A plurality of gemstones or other objects having the RFID chips attached are supported in an enclosure 20 which may be a display case, storage cabinet, etc. The storage container 20 supports a source 30 for irradiating the RFID chips on the objects 10. The irradiation may be RF energy, in which case the source 30 is an antenna, or it may be light energy of a particular frequency. The enclosure 20 also includes an antenna 40 to pick up the RF signals transmitted by the RFID chips on the objects 10 when they are illuminated, which signals contain their serial number.

Both the irradiating source 30 and the pick up antenna 40 are connected to a transceiver 50 which energizes the illumination source 30 and receives the signals picked up by the antenna 40. The transceiver is connected to a computer 60 which has an associated display 70. A reader 80 on which an RFID equipped gemstone 10 may be placed is connected to the computer 60. The computer also receives a microphone 90 which allows the input of data relating to the stones into a database supported in the computer.

The enclosures would be equipped with antennas to receive this multiplicity of signals. The antennas would be connected to a transceiver with anti-collision capability. This transceiver would be connected to a computer or remote terminal. The computer, by controlling the operation of the transceiver, constantly polls the contents of these enclosures. It would instantly detect the removal of any RFID equipped object and display its description.

The computer would also contain all relevant information regarding the RFID equipped objects such as size, cost, quality, etc. This information could be inputted by keyboard or by utilizing voice recognition. Voice recognition, utilizing a program such as supplied by IBM, would provide a time saving method of inputting data while grading stones by using a microphone as the input device. All information relative to an RF equipped object could be obtained by placing the RFID equipped object on a reader device connected to the computer. The reader would activate the RFID chip, read its serial number, then display this information on the computer's screen.

All RFID chips are unable to radiate power without an external antenna. In an application with minimum physical dimensions, the addition of a bulky antenna to the chip could void the application. The solution to this problem is to manufacture an RFID chip with an integral antenna. In order to achieve maximum electrical efficiency, the area of the antenna should be as large as the chip.

One method for manufacturing would be as follows: 1) coat the chip with an insulating layer; 2) process the antenna on this layer; and 3) appropriate connections between the antenna and the chip would ensure maximum antenna efficiency.

Figure 3:
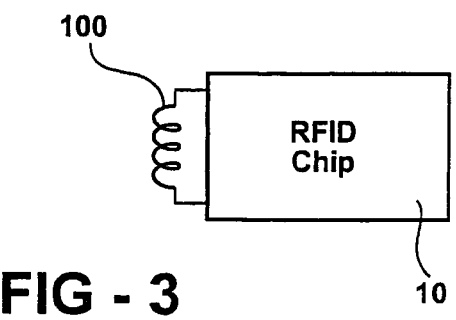
FIG. 3 is a schematic diagram of an RFID chip and associated antenna.
Figure 4:
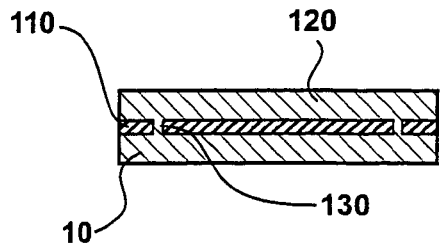
FIG. 4 is a side view of an RFID chip with integral antenna.

FIG. 3 is a schematic illustration of an RFID chip 10 and its attached antenna 100. FIG. 4 is a side view, or cross-sectional view, illustrating the chip 10, with a superimposed insulating layer 110 with an antenna layer 120 superimposed on the insulating layer and feed through connections 130, joining the two.

Having disclosed my invention, I claim:

1. A system of inventorying and identifying gemstones, comprising:

securing RFID chips, each having a unique serial number, to a plurality of gemstones;

storing said gemstones in an enclosure;

providing a transceiver operative to generate interrogating signals for the RFID chips and to receive data signals from the interrogating chips;

a computer having an identifying and interrogating application program connected to the transceiver, and an antenna for the transceiver disposed proximate to said enclosure; and activating said computer to generate interrogating signals for said chips and to maintain an inventory of gemstones in the enclosure and identify missing chips based on signals received by the antenna.

2. The system of claim 1, further including an antenna supported on each gemstone and operatively connected to the output of the RFID chip secured to such gemstone.

3. The system of claim 1, wherein said interrogating signal is light energy.

4. The system of claim 1, wherein said interrogating signal is RF energy.

5. The system of claim 1, wherein said transceiver has anti-collision capability, and said computer controls said transceiver to constantly poll the contents of said enclosure to detect the removal of any said gemstones secured to said RFID chips.

6. The system of claim 1, wherein the method of securing said RFID chips comprises covering said chips with a material which provides a visual indication of the removal of said chip from said gemstone.

7. The method of claim 6, wherein said securing material is a clear UV epoxy that provides instant adhesion to said gemstone.

8. The system of claim 1, further comprising a reader; a display; a microphone; and a database, wherein said computer is connected to said reader for placement of said gemstones with said RFID chips for recordation of said unique serial numbers of said chips, and wherein said computer receives said microphone which allows the input of data relating to said gemstones in said database supported in said computer utilizing voice recognition.

9. The system of claim 8, further comprising a keyboard which is operatively connected to said computer for inputting information related to said gemstone in said database.

10. The system of claim 2 wherein said RFID chip further comprises an insulating layer, and said insulating layer is disposed on top of said RFID chip; and said antenna is applied to said insulating layer; and vias are made in sail insulating layer to allow for appropriate connections between said antenna and said RFID chip.

11. The system of claim 10, wherein said antenna has a surface area approximate in size to said insulating layer of said RFID chip.

* * * * *

UNITED STATES PATENT AND TRADEMARK OFFICE
CERTIFICATE OF CORRECTION

PATENT NO. : 7,119,683 B2 Page 1 of 1
APPLICATION NO. : 11/047072
DATED : October 10, 2006
INVENTOR(S) : Walter Rubinstein It is certified that error appears in the above-identified patent and that said Letters Patent is hereby corrected as shown below:

Column 4, Claim 10, Line 19, Replace "made in sail" with --made in said--.

Signed and Sealed this

Sixth Day of March, 2007

JON W. DUDAS
*Director of the United States Patent and Trademark Office*